United States Patent [19]

Sugiura

[11] Patent Number: 5,043,804
[45] Date of Patent: Aug. 27, 1991

[54] COLOR VIDEO CAMERA WITH COLOR REPRODUCIBILITY COMPENSATION FOR DISCHARGE LAMP AMBIENT LIGHT SOURCE

[75] Inventor: Hiroaki Sugiura, Kyoto, Japan

[73] Assignee: Mitsubishi Denki Kabushiki Kaisha, Tokyo, Japan

[21] Appl. No.: 514,482

[22] Filed: Apr. 25, 1990

[51] Int. Cl.⁵ ............................................. H04N 9/73
[52] U.S. Cl. .................................... 358/41; 358/29 C
[58] Field of Search .................... 358/27, 29, 29 C, 41, 358/44, 211, 213.16

[56] References Cited
U.S. PATENT DOCUMENTS
4,574,303  3/1986  Hashimoto et al. ............... 358/29 C
4,646,161  2/1987  Tsuchiya et al. .................. 358/29 C

FOREIGN PATENT DOCUMENTS
41-16011  7/1966  Japan .

Primary Examiner—James J. Groody
Assistant Examiner—Kim Yen Vu
Attorney, Agent, or Firm—Rothwell, Figg, Ernst & Kurz

[57] ABSTRACT

A color reproducibility compensation circuit invention is adapted, when a large amount of A.C. component is included in a light source as when it is discharge lamp illumination including white fluorescent lamp illumination, to obtain a control signal for color reproducibility compensation through table look-up with an output of a divider used as the look-up valve, whereby a color reproducibility compensation circuit is controlled. Thus, it is made possible to realize a color video camera capable, even under discharge lamp illumination, of providing a video image in which optimum color reproduction equivalent to that obtained in fine afternoon weather is achieved.

9 Claims, 8 Drawing Sheets

COLOR VIDEO CAMERA WITH COLOR REPRODUCIBILITY COMPENSATION FOR DISCHARGE LAMP AMBIENT LIGHT SOURCE

BACKGROUND OF THE INVENTION

1. Field of the Invention

The present invention relates to a color video camera capable of providing good color reproducibility even under illumination with discharge lamps such as white fluorescent lamps having an inferior color rendering property.

2. Description of the Prior Art

Figure 1:
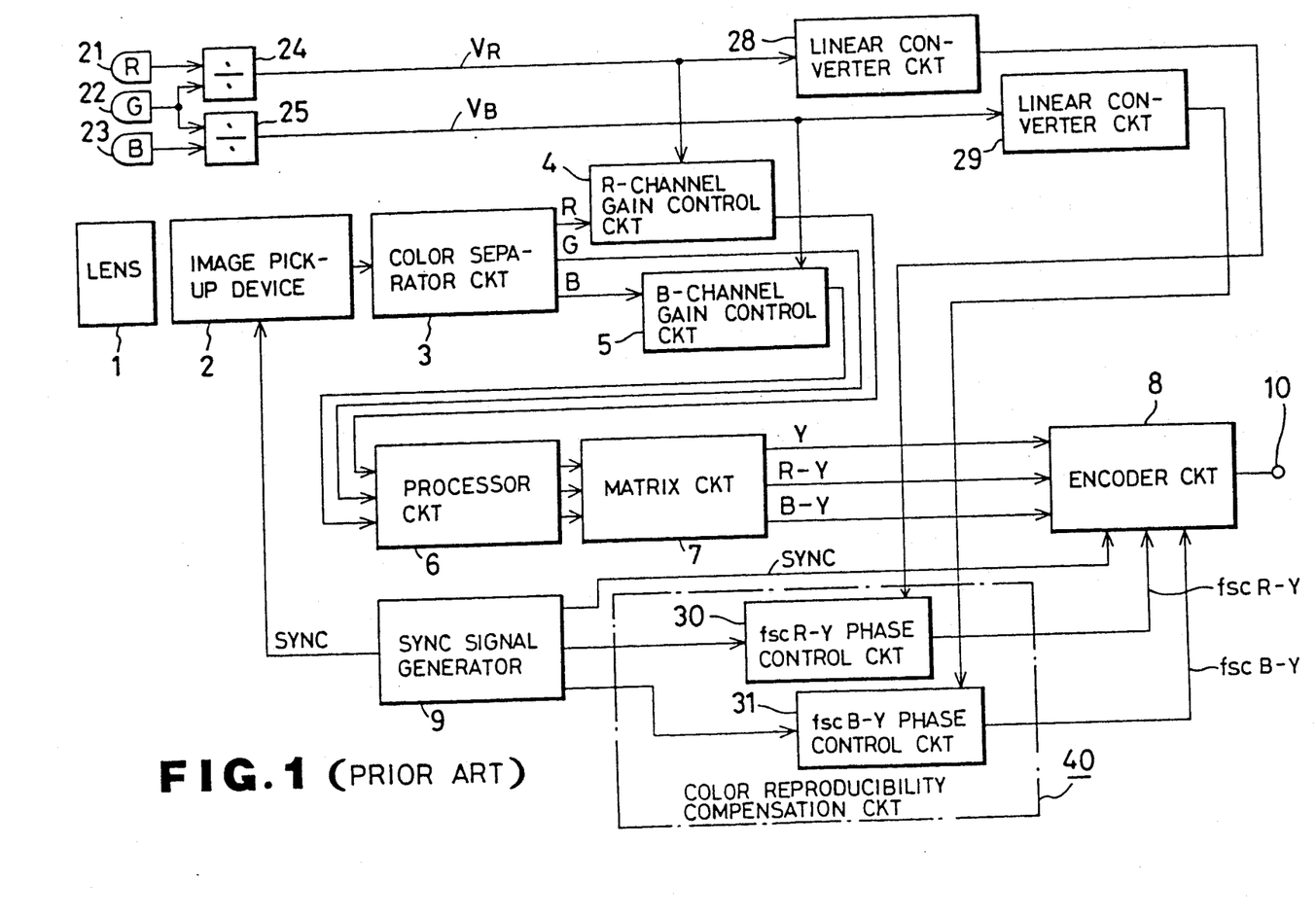
FIG. 1 is a block diagram showing a prior art color video camera.

FIG. 1 is a block diagram showing a prior art color video camera disclosed in Japanese Utility Model Publication No. 41-16011. Referring to the diagram, reference numeral 1 denotes a lens, 2 denotes an image pickup device, 3 denotes a color separator, 4 denotes an R-channel gain control circuit, 5 denotes a B-channel gain control circuit, 6 denotes a processor circuit, 7 denotes a matrix circuit, 8 denotes an encoder, 9 denotes a sync signal generator, 10 denotes an output terminal, 21 denotes an R sensor (photoelectric transfer device), 22 denotes a G sensor (photoelectric transfer device), 23 denotes a B sensor (photoelectric transfer device), 24 and 25 denote dividers, 28 and 29 denote linear converter circuits, 30 denotes an fscR-Y phase control circuit for varying the phase of a chrominance subcarrier fscR-Y modulated by a color difference signal R-Y, 31 denotes an fscB-Y phase control circuit for varying the phase of a chrominance subcarrier fscB-Y modulated by a color difference signal B-Y, and 40 denotes a color reproducibility compensation circuit formed of the phase control circuits 30 and 31.

Operation of the camera will be described below. An optical image incoming through the lens 1 is focused onto and photoelectrically transformed by the image pickup device 2 and separated into three color signals R, G, and B by the color separator 3. Then, the R-channel gain control circuit 4 controls the gain of the R signal in the R channel and the B-channel gain control circuit 5 controls the gain of the B signal in the B channel, whereby adjustment of white balance is performed.

On the other hand, the R sensor 21, G sensor 22, and B sensor 23 generate outputs respectively proportional to the R component, G component, and B component of the incident light. Signals $R_S$, $G_S$ and $B_S$ respectively representing values of these outputs, the divider 24 outputs a ratio of the G component to the R component, $G_S/R_S (=V_R)$, which is not dependent on quantity of the incident light. Likewise, the divider 25 outputs a ratio of the B component to the G component, $B_S/G_S (=V_B)$ Here, the gain control circuit 4 is adapted such that its gain becomes greater as the control voltage $V_R$ becomes greater, whereas the other gain control circuit 5 is adapted such that its gain becomes smaller as the control voltage $V_B$ becomes greater. Accordingly, in the case where a color source is of a low color temperature, i.e., where the R component is greater and the B component is smaller as against the G component, the ratios $V_R = G_S/R_S$ and $V_B = B_S/G_S$ both become smaller in value than those in the case of a light source of a high color temperature and, hence, the gain of the R-channel gain control circuit 4 becomes smaller, while the gain of the B-channel gain control circuit 5 becomes greater.

On the other hand, in the case where a color source is of a high color temperature, i.e., where the R component is smaller and the B component is greater as against the G component, the gain of the R-channel gain control circuit 4 becomes greater while the gain of the B-channel gain control circuit 5 becomes smaller. In the described manner, the adjustment for white balance is performed through automatic control of the gain of the R-channel gain control circuit 4 and the gain of the B-channel gain control circuit 5 in response to the changes in the R component, B component, and G component of the incident light source. When the color temperature varies due to such factors as the spectral sensitivity characteristic of the image pickup device 2 and the signal processing method, the phase of the color signal varies even if the white balance is adjusted correctly. Therefore, the values $V_R$ and $V_B$ are subjected to a linear conversion in the linear converter circuits 28 and 29, respectively, and the outputs are supplied to the phase control circuits 30 and 31, and thereby, compensation for changes in the phase of the color signal is performed.

Figure 2:
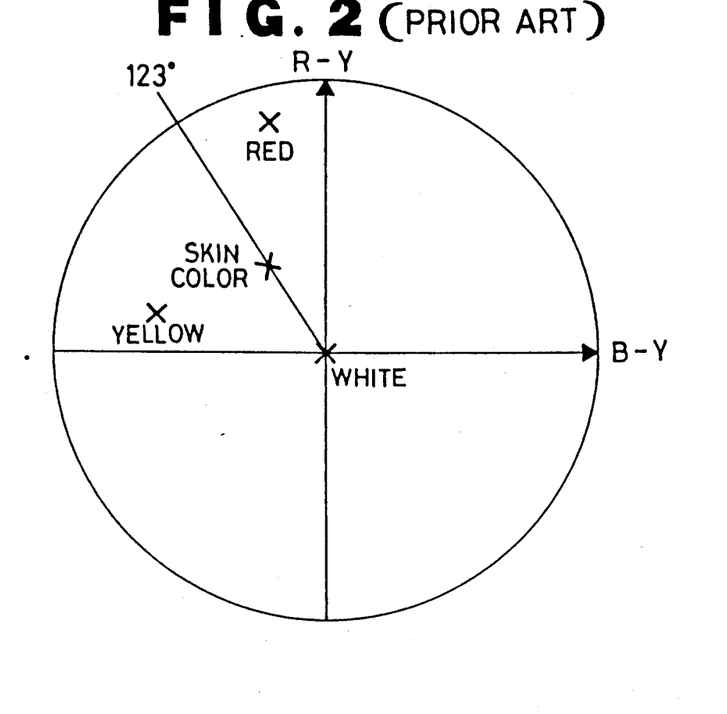
FIGS. 2 and FIG. 3 are vector diagrams showing phases of color difference signals obtained through the prior art color video camera in fine afternoon weather and under discharge lamp illumination respectively.

FIG. 2 is a vector diagram indicating a case where red, yellow, skin color, and white charts are picked up in fine afternoon weather (before a sunset, at a color temperature around 4000° K.) by the color video camera as described above, and FIG. 3 is a vector diagram in the case where red, yellow, skin color, and white charts are picked up under white fluorescent lamp illumination (at a color temperature around 4000° K.) by the same. In either case, the voltage values controlling the gains of the gain control circuits 4 and 5 are virtually equal and the adjustments for white balance are correctly performed.

Further, there is known another prior art circuit in which, instead of the phase control circuits 30 and 31 in FIG. 1, gain control circuits are inserted in the lines for color difference signals R-Y and B-Y between the matrix circuit 7 and the encoder 8 so that the color difference signals R-Y and B-Y are corrected for changes in amplitude produced at the time an adjustment is made for white balance.

Furthermore, there is known another prior art example in which, instead of the phase control circuits 30 and 31 in FIG. 1, mixer circuits are inserted in the lines for color difference signals R-Y and B-Y between the matrix circuit 7 and the encoder 8 so that mixing rates of the color difference signals R-Y and B-Y are controlled by the outputs of the linear converter circuits 28 and 29 and thereby the changes in the phase are corrected.

Figure 3:
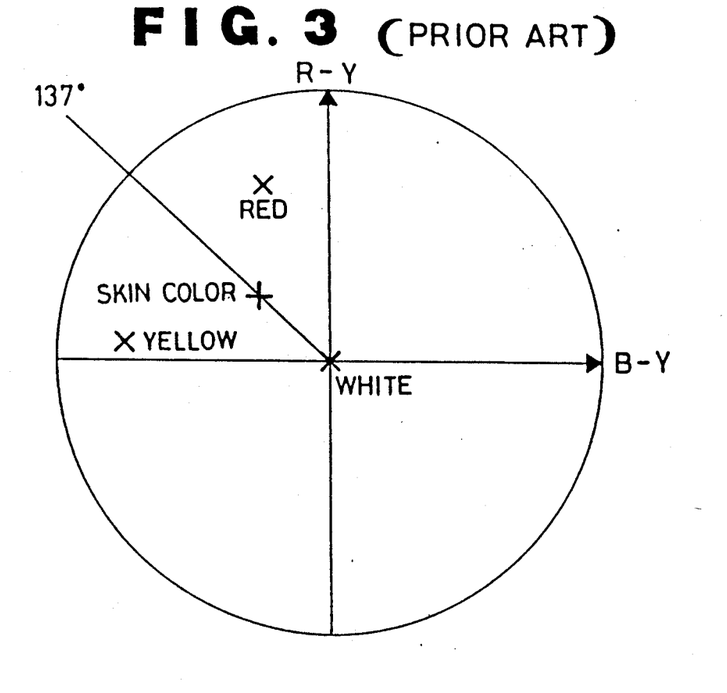

With prior video cameras arranged as described above, phase and amplitude of red, yellow, and skin color generally become worse under white fluorescent lamp illumination as compared to afternoon sunlight illumination as will be known by comparing FIG. 3 with FIG. 2, because of the inferior color rendering property of the white fluorescent lamp illumination. As to the phase of skin color, in particular, though it is at a preferable phase of 123° in FIG. 2, the phase is shifted to 137° in FIG. 3, that is, the skin color becomes yellowish, and this poses a problem in visual sensitivity. Further, since the skin color is a memory color, it is desirable that it have a constant phase and amplitude regardless of the kind of light source. However, the allowance is especially narrow for the change in its phase and, hence, there has been a problem that the variations in the phase of the skin color become marked particularly under white fluorescent lamp illumination having such inferior color rendering property. A method for improving color reproducibility with attention only paid to change in color temperature is described, for example, in a paper, "Improvement in Color Reproducibility in a Camera of Full Color Difference Line Sequential System", Preliminary Papers for Nationwide University Lectures of Japan Society of Television Engineers, pp. 81-82, 1986, but sufficient effects have not been obtained as yet by these methods under a light source with such an inferior color rendering property as described above.

Figure 4:
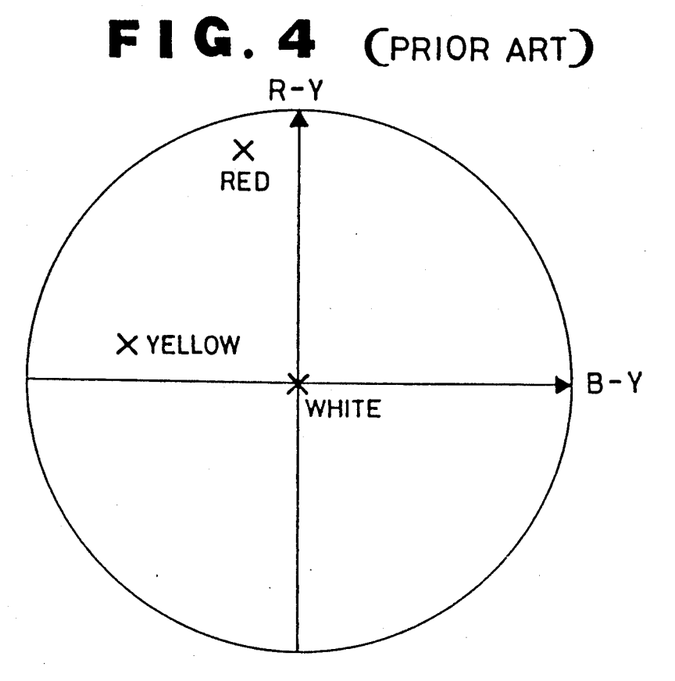
FIG. 4 and FIG. 5 are vector diagrams showing gains obtained through another prior art example of a color video camera in fine afternoon weather and under discharge lamp illumination respectively.
Figure 5:
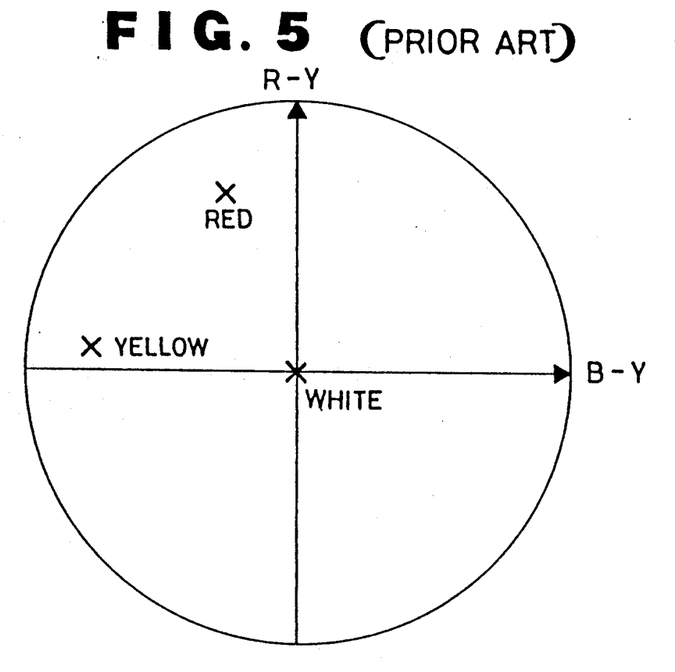

In the above described type provided with gain control circuits instead of the phase control circuits 30 and 31, such a prior art color video camera was adapted to control the gains of the color difference signals R-Y and B-Y with values obtained by a linear conversion of the values $V_R$ ($=G_S/R_S$) and $V_B$ ($=G_S/B_S$). Hence, although it is desirable that the skin color, being a memory color, is reproduced with a constant phase and amplitude regardless of the kind of light sources, there was a problem that under a light source having an inferior color rendering property such as white fluorescent lamp illumination, phase and amplitude under such white fluorescent lamp illumination are shifted as shown in FIG. 5 from the case in fine afternoon weather as shown in FIG. 4.

SUMMARY OF THE INVENTION

The present invention has been made to solve the above mentioned problems. It is an object of the present invention to obtain a color video camera providing good color reproducibility even under a light source having an inferior color rendering property such as white fluorescent lamp illumination.

In order to achieve the above mentioned object, the color video camera according to the present invention is adapted such that an A.C. component included in a light source is detected by an A.C. detection circuit and, depending on the magnitude of the detected A.C. component, linearly converted signals of outputs of dividers or control signals for optimum color reproducibility compensation are selectively output by a switching circuit, and thereby, a color reproducibility compensation circuit formed of such circuits as phase control circuits, gain control circuits, or mixer circuits of color difference signals, is controlled.

The above and other objects and novel features of the present invention will become more fully understood from the detailed description given hereinbelow when the same is read in connection with the accompanying drawings. However, the drawings are for purpose of illustration only, and thus are not limitative of the scope of the present invention.

DETAILED DESCRIPTION OF THE PREFERRED EMBODIMENTS

Figure 6:
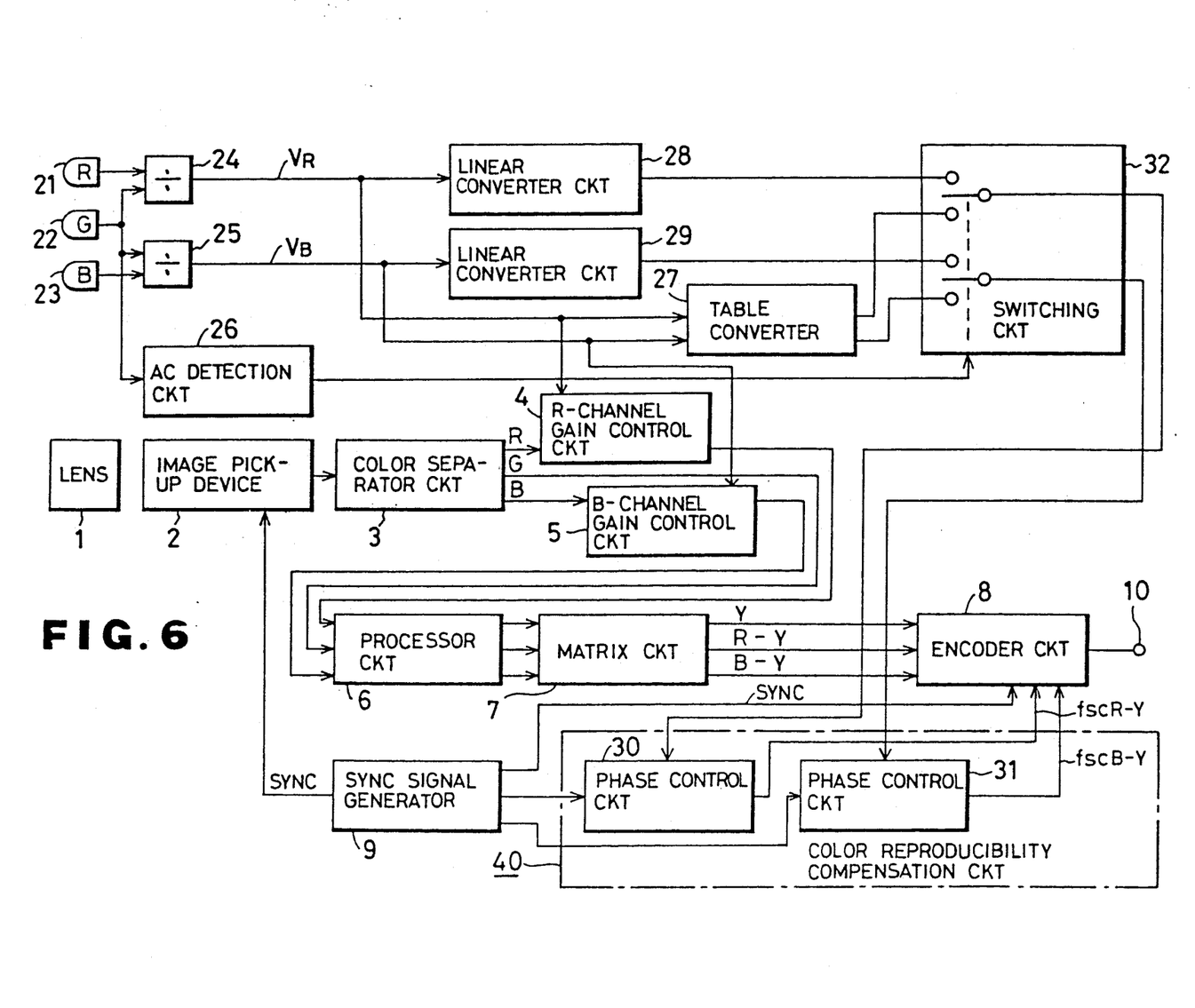
FIG. 6 is a block diagram showing a color video camera according to an embodiment of the present invention.

An embodiment of the present invention will be described with reference to the accompanying drawings. Referring to FIG. 6, reference numeral 26 denotes an A.C. detection circuit connected to the G sensor 22, 27 denotes a table converter, and 32 denotes a switching circuit for selecting outputs of the linear converter circuits 28 and 29 or outputs of the table converter 27. Other blocks corresponding to those in FIG. 1 are denoted by corresponding reference numerals, and accordingly repeated description thereof will be omitted.

Operations of the embodiment will be described below. In this invention, the A.C. component included in the light source is detected by the A.C. detection circuit 26, and when this A.C. component is small, outputs of the linear converter circuits 28 and 29 are selected by the switching circuit 32, and thereafter, the same operations as in the prior art example are performed.

When the A.C. component included in the light source detected by the A.C. detection circuit 26 is great, outputs of the table converter 27 are selected by the switching circuit 32.

Figure 7:
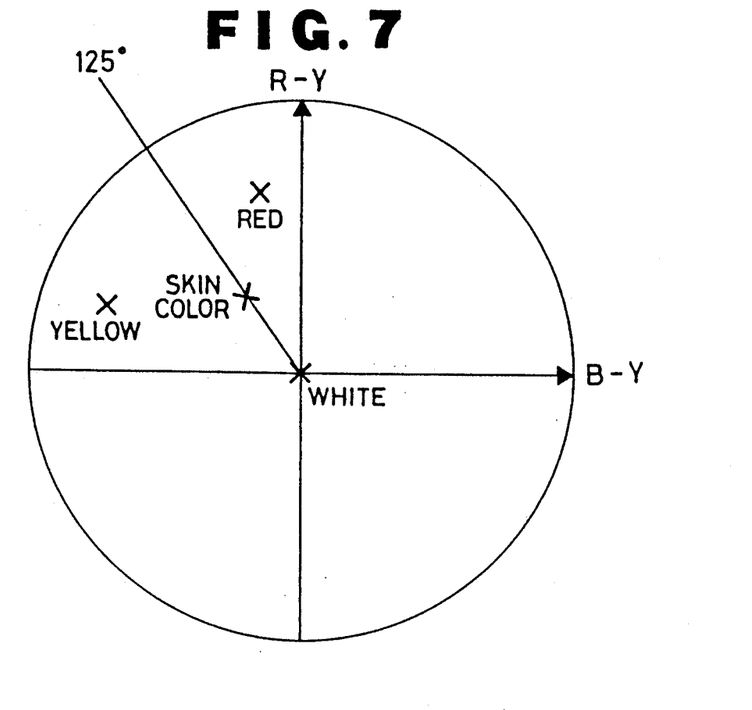
FIG. 7 is a vector diagram of color difference signals obtained through the color video camera of FIG. 6.

A light source in which the A.C. component is detected is chiefly discharge lamp illumination including such as white fluorescent lamp illumination. If a light source meets the condition that it has a great A.C. component, then, the type of discharge lamp can be distinguished according to the outputs $V_R$ and $V_B$ of the dividers 24 and 25. Accordingly, the table converter 27 supplies phase control voltages for providing chrominance subcarriers fscR-Y and fscB-Y most suitable for each discharge lamp, as a control signal for color reproducibility compensation, to the phase control circuits 30 and 31 of the color reproducibility compensation circuit 40. Thus, in the case of the white fluorescent lamp as shown in FIG. 3, by shifting the fscR-Y by about $-8°$ and the fscB-Y by $-15°$ as against the case of FIG. 2, practically satisfactory color reproducibility as shown in FIG. 7 can be obtained.

Figure 8:
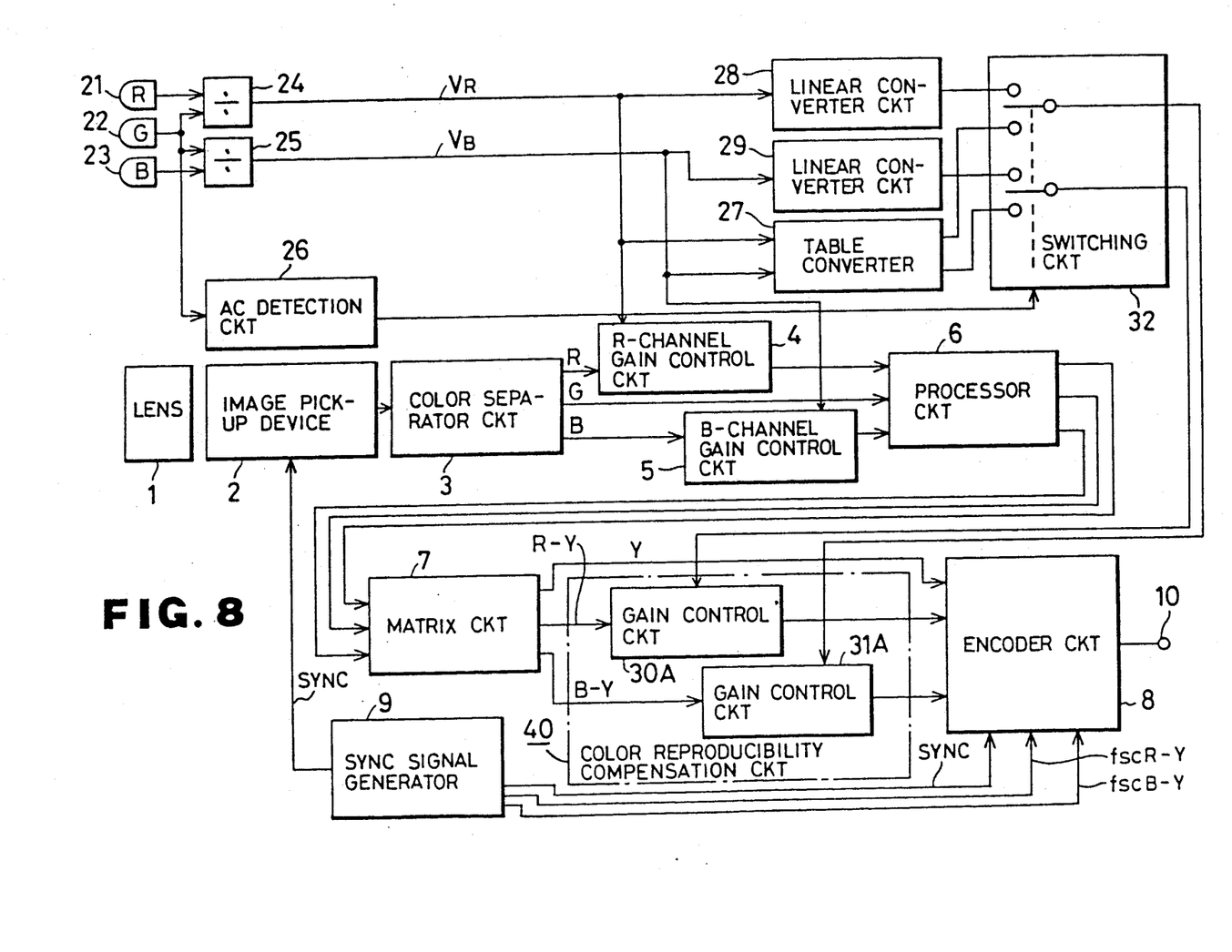
FIG. 8 is a block diagram showing another embodiment of the present invention.

FIG. 8 shows another embodiment of the present invention in which gain control circuits 30A and 31A, as constituents of the color reproducibility compensation circuit 40, instead of the phase control circuits 30 and 31 in FIG. 6, are inserted in the lines for the color difference signals R-Y and B-Y between the matrix circuit 7 and the encoder 8, respectively. Other blocks corresponding to those shown in FIG. 6 are denoted by corresponding reference numerals, and accordingly the repeated explanation of the same will be omitted.

In this present embodiment, when the A.C. component included in the light source detected by the A.C. detection circuit 26 is great, outputs of the table converter 27 are selected by the switching circuit 32.

Figure 9:
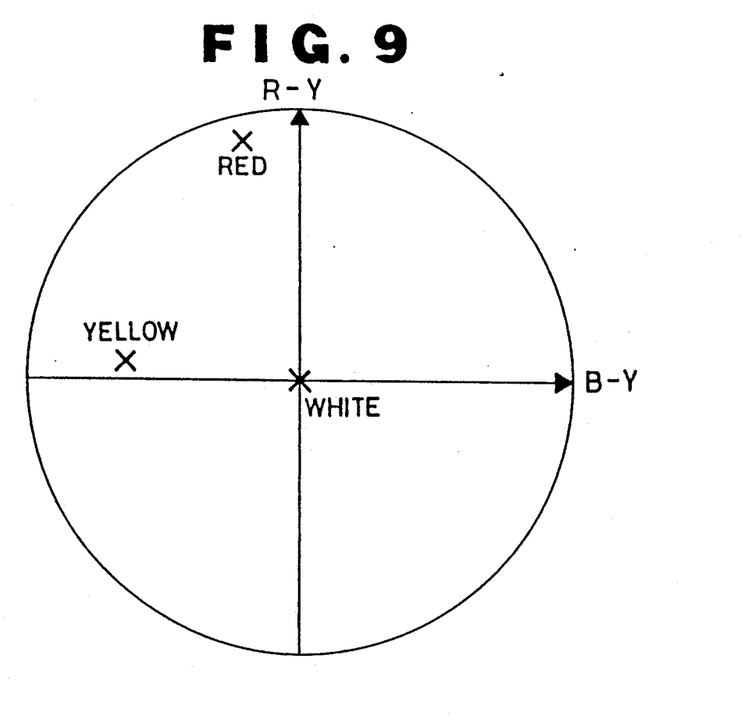
FIG. 9 is a vector diagram of color difference signals obtained through the color video camera of FIG. 8.

A light source in which the A.C. component is detected is chiefly discharge lamp illumination including white fluorescent lamp illumination. If a light source meets the condition that it has a great A.C. component, then, the type of discharge lamp can be distinguished according to the outputs $V_R$ and $V_B$ of the dividers 24 and 25, and accordingly the table converter 27 outputs gain control voltages for providing the color difference signals R-Y and B-Y most suitable for each type of discharge lamp. Thus, in the case of the white fluorescent lamp as shown in FIG. 5, by multiplying the gain of the color difference signal R-Y by about 1.3 and the gain of the color difference signal B-Y by about 0.8 as against the case of FIG. 4, practically satisfactory color reproducibility as shown in FIG. 9 can be obtained.

Figure 10:
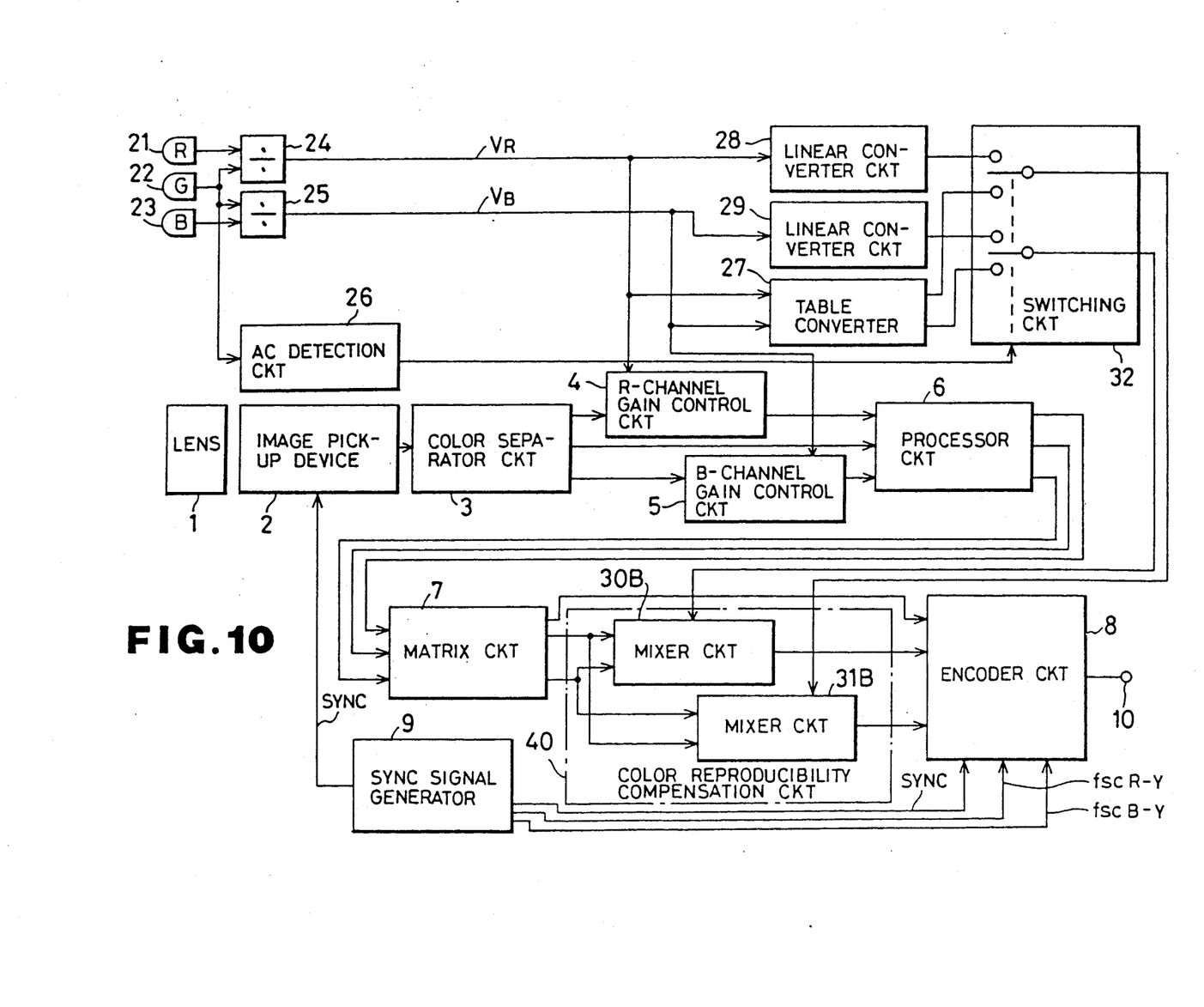
FIG. 10 is a block diagram showing a further embodiment of the present invention.

FIG. 10 shows a further embodiment of the present invention in which mixer circuits 30B and 31B, as constituents of the color reproducibility compensation circuit 40, instead of the phase control circuits 30 and 31 in FIG. 6, are inserted in the lines for the color difference signals R-Y and B-Y between the matrix circuit 7 and the encoder 8 respectively. These mixer circuits set up mixing rates of the color difference signals R-Y and B-Y in response to signals from the switching circuit 32. Other blocks corresponding to those shown in FIG. 6 are denoted by corresponding reference numerals, and accordingly the repeated explanation of the same will be omitted.

In the embodiment of FIG. 10, if the light source meets the condition that it has a great A.C. component, then, the discharge lamp type can be distinguished according to the outputs $V_R$ and $V_B$ of the dividers. Accordingly, the table converter 27 supplies voltages for controlling the mixing rates for providing color difference signals most suitable for each discharge lamp type as a control signal for color reproducibility compensation, through the switching circuit 32 to the mixer circuits 30B and 31B of the color reproducibility compensation circuit 40.

Now, (R-Y)' and (B-Y)' representing outputs of the mixer circuits 30B and 31B respectively, the following expressions (1) and (2) are obtained:

$$(R-Y)' = (R-Y) + k_1(B-Y) \quad (1)$$

$$(B-Y)' = k_2(R-Y) + (B-Y) \quad (2)$$

By setting $k_1=0$, $k_2=0$ in the case of FIG. 2, and by setting $k_1=-0.26$, $k_2=0.14$ in the case of FIG. 3, satisfactory color reproducibility as shown in FIG. 7 can be obtained.

Although only cases of video color cameras handling color difference signals R-Y and B-Y have only been described in the foregoing, the same effects obtained by the above described embodiments can be also obtained even if the signals are IQ color difference signals or other type of color difference signals.

Figure 11:
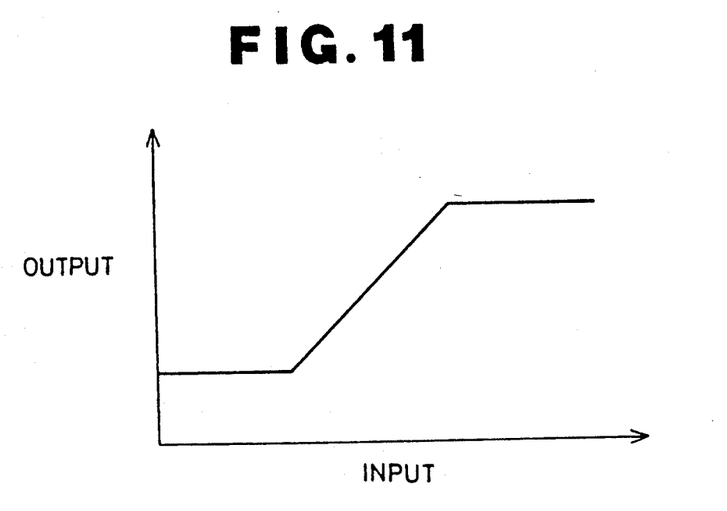
FIG. 11 and FIG. 12 are input-output characteristics of a limiting circuit and a folded-line circuit according to the present invention used in place of linear converter circuits.
Figure 12:
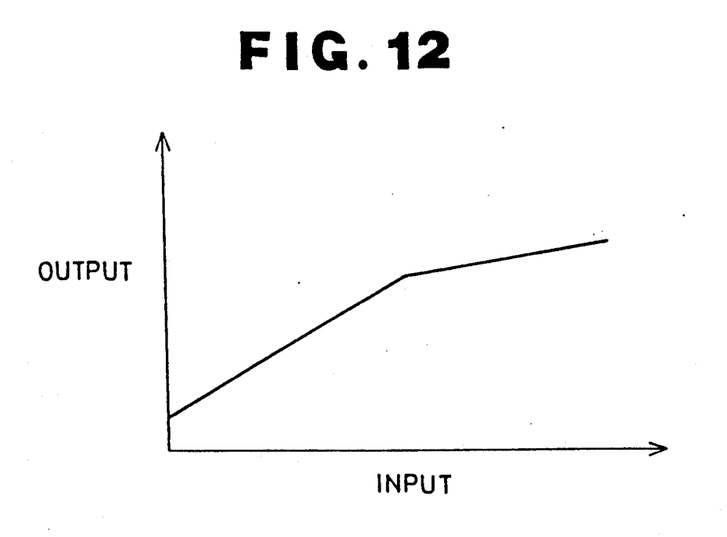

By using nonlinear converter circuits having a limiting characteristic as shown in FIG. 11 or nonlinear converter circuits having a folded-line characteristic as shown in FIG. 12 in place of the linear converter circuits 28 and 29, an arrangement whereby a signal of greater magnitude is output upon receipt of an input at a level higher than a preset level can be realized.

Further, the dividers 24 and 25, A.C. detection circuits 26, table converter 27, linear converter circuits 28 and 29, switching circuit 32, and so on may be realized by hardware or by software to provide the same effects as achieved by the above described embodiments. Then, if they are arranged by software, the linear converter circuits may be arranged by a table converter. In that case, there should be provided two table converters, i.e., one which is selected when the A.C. component is greater than a specified level and the other which is selected when it is lower than the specified level.

The dividers 24 and 25 are only required to be such that outputs thereof are each a ratio between two input variables and, hence, they may also be, for example, such that provide logarithmically converted outputs.

According to the present invention as described so far, it is adapted such that the illumination is detected to be that of discharge lamps such as white fluorescent lamps or not depending on the output of an A.C. detection circuit, and in the case of discharge lamp illumination, the phases of the chrominance subcarriers, the gains of color difference signals, or the mixing ratios of color difference signals most suitable for each discharge lamp are provided by the table converter for use in necessary compensation. Therefore, an effect is obtained that a color image excellent in color reproduction can be produced even in the case of image taken by a camera under such discharge lamp illumination.

What is claimed is:

1. A color video camera comprising:
   photoelectric transfer means for detecting color component qualities of a light source;
   divider means responsive to outputs from said photoelectric transfer means, for obtaining ratios therebetween;
   an A.C. detection circuit responsive to an output from said photoelectric transfer means, for detecting a magnitude of an A.C. component thereof;
   first converter means for outputting first control signals for color reproducibility compensation corresponding to the ratios output from said divider means;
   second converter means for outputting second control signals for color reproducibility compensation corresponding to the ratios output from said divider means;
   a switching circuit for selecting either of said first or second control signals for color reproducibility compensation according to the magnitude of the A.C. component detected by said A.C. detection circuit and outputting the selected signals as control signals for optimum color reproducibility compensation; and
   a color reproducibility compensation circuit controlled by said control signals for optimum color reproducibility compensation output from said switching circuit, for compensating the color reproducibility of a video signal obtained through an image pickup device.

2. A color video camera according to claim 1, wherein
   said color reproducibility compensation circuit comprises chrominance subcarrier phase control circuit means for adjusting chrominance subcarrier phase, being controlled by said control signals for optimum color reproducibility compensation output from said switching circuit.

3. A color video camera according to claim 1, wherein
   said color reproducibility compensation circuit comprises color difference signal gain control circuit means for controlling color difference signal gain, being controlled by said control signals for optimum color reproducibility compensation output from said switching circuit.

4. A color video camera according to claim 1, wherein
said color reproducibility compensation circuit comprises color difference signal mixer circuit means for controlling color difference mixing ratio, being controlled by said control signals for optimum color reproducibility compensation output from said switching circuit.

5. A color video camera according to any one of claims 1 to 4, wherein
said first and second converters are respectively a linear converter circuit and a table converter.

6. A color video camera according to any one of claims 1 to 4, wherein
said first and second converters are respectively a nonlinear converter circuit having a limiting characteristic and a table converter.

7. A color video camera according to any one of claims 1 to 4, wherein
said first and second converters are respectively a nonlinear converter circuit having a folded-line characteristic and a table converter.

8. A color video camera according to any one of claims 1 to 4, wherein
said first and second converters are respectively a first table converter and a second table converter.

9. A method for compensating for poor color reproducibility output of a color video camera under discharge lamp illumination, comprising the steps of:
detecting the A.C. component of an incident light source;
detecting the color temperature of said incident light source;
generating separate color reproducibility compensation control signals based on color temperature for discharge lamp incident light and non-discharge lamp incident light;
applying said non-discharge lamp compensation control signal to a color reproducibility compensation control circuit when said A.C. component is below a predetermined level; and
applying said discharge lamp compensation control signal to said compensation control circuit when said A.C. component is above said predetermined level.

* * * * *

UNITED STATES PATENT AND TRADEMARK OFFICE
CERTIFICATE OF CORRECTION

PATENT NO. : 5,043,804

DATED : August 27, 1991

INVENTOR(S) : Hiroaki Sugiura

It is certified that error appears in the above-identified patent and that said Letters Patent is hereby corrected as shown below:

On the cover page, first line of Abstract, delete "invention".

Column 2, line 54, "known" should be --apparent--.

Column 4, line 47, after "each" insert --type of--.

Column 5, line 52, delete "only".

Column 8, line 11, "the" should be --an--.

Signed and Sealed this

Tenth Day of August, 1993

Attest:

MICHAEL K. KIRK

*Attesting Officer*        *Acting Commissioner of Patents and Trademarks*